United States Patent

[11] 3,574,995

| [72] | Inventor | Vernon P. Turner |
| | | Davidson, N.C. |
| [21] | Appl. No. | 864,585 |
| [22] | Filed | Oct. 8, 1969 |
| [45] | Patented | Apr. 13, 1971 |
| [73] | Assignee | General Time Corporation |

[54] DIGITAL TIMEKEEPING DEVICE WITH IMPROVED INDEXING MECHANISM
6 Claims, 4 Drawing Figs.

[52] U.S. Cl. ................................................. 58/125
[51] Int. Cl. .................................................. G04b 19/02
[50] Field of Search ........................................ 58/125 (C); 74/125; 235/134, 117

[56] References Cited
UNITED STATES PATENTS

| 521,001 | 6/1894 | Reinhardt ..................... | 235/117 |
| 2,102,533 | 12/1957 | Hovey .......................... | 235/117 |
| 2,596,370 | 5/1952 | Bush ............................. | 235/134 |
| 3,279,166 | 10/1966 | Funaki .......................... | 58/125 |

Primary Examiner—Richard B. Wilkinson
Attorney—Pennie, Edmonds, Morton, Taylor & Adams ABSTRACT: A time-keeping device providing digital visual indication of the time. Indexing means are provided to permit digital visual indication of the time in terms of full integers. The indexing means utilized includes a cam wheel and an index wheel, the camming surfaces of the cam wheel being sloped in reverse of the ratchet teeth of the index wheel. A pawl is provided to engage the ratchet teeth of the index wheel until released by the camming surfaces of the cam wheel whereupon the index wheel rotates as a result of being continuously urged to rotate in the same direction as the cam wheel. The rotation of the index wheel is limited to a predetermined angular amount by means acting between the two wheels. Means are provided for permitting setting and adjustment of the indexing mechanism in order to cause the indicating means to permit visual observation of the correct time.

Patented April 13, 1971 3,574,995
3 Sheets-Sheet 1
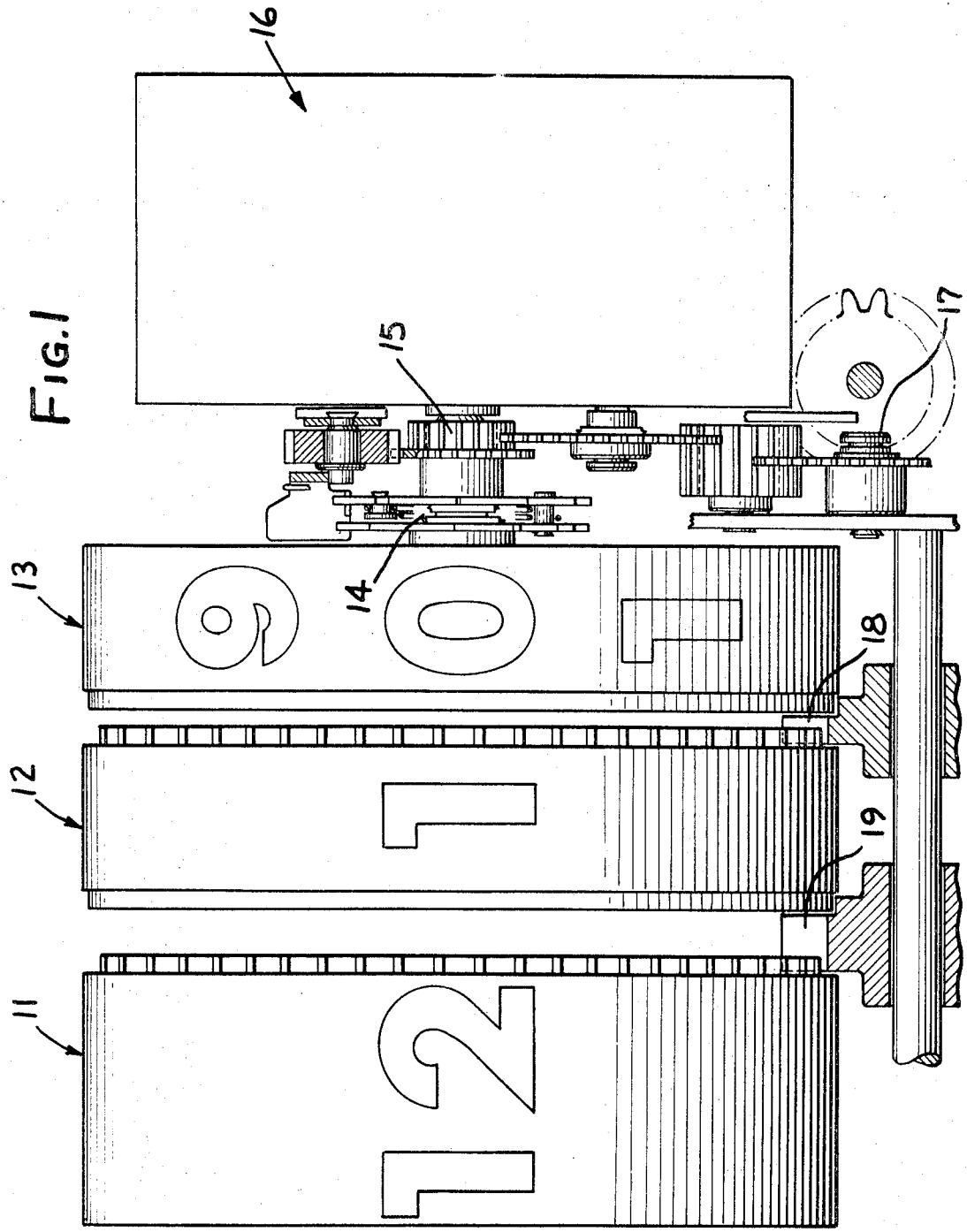
INVENTOR
VERNON P. TURNER
by: Wolfe, Hubbard, Voit & Osann
ATTYS.

Patented April 13, 1971
3,574,995
3 Sheets-Sheet 2
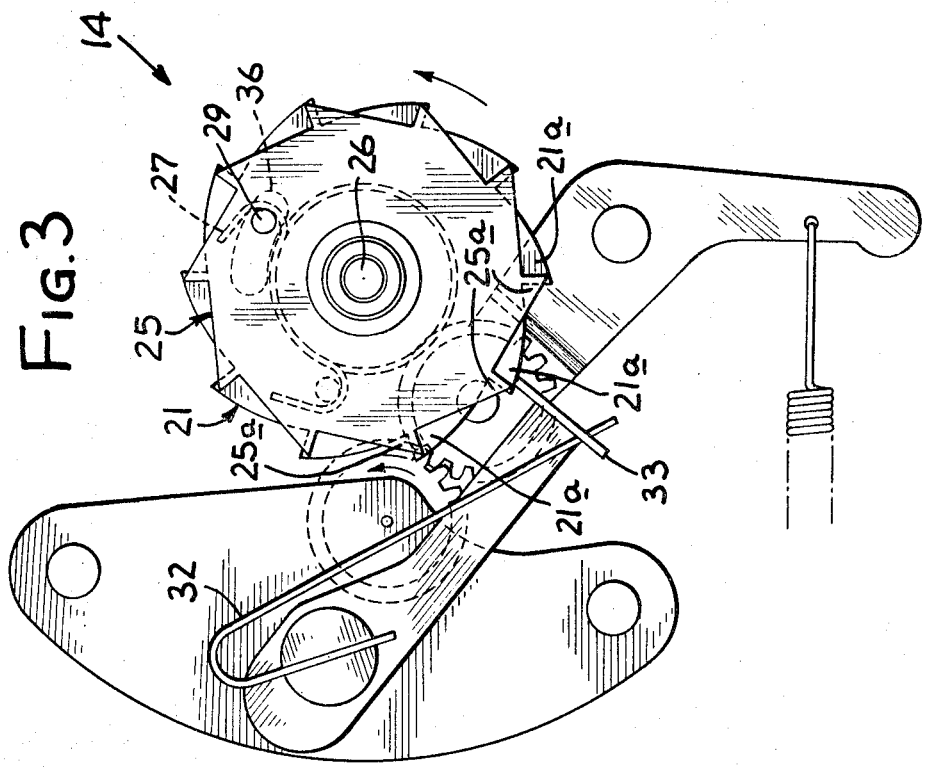
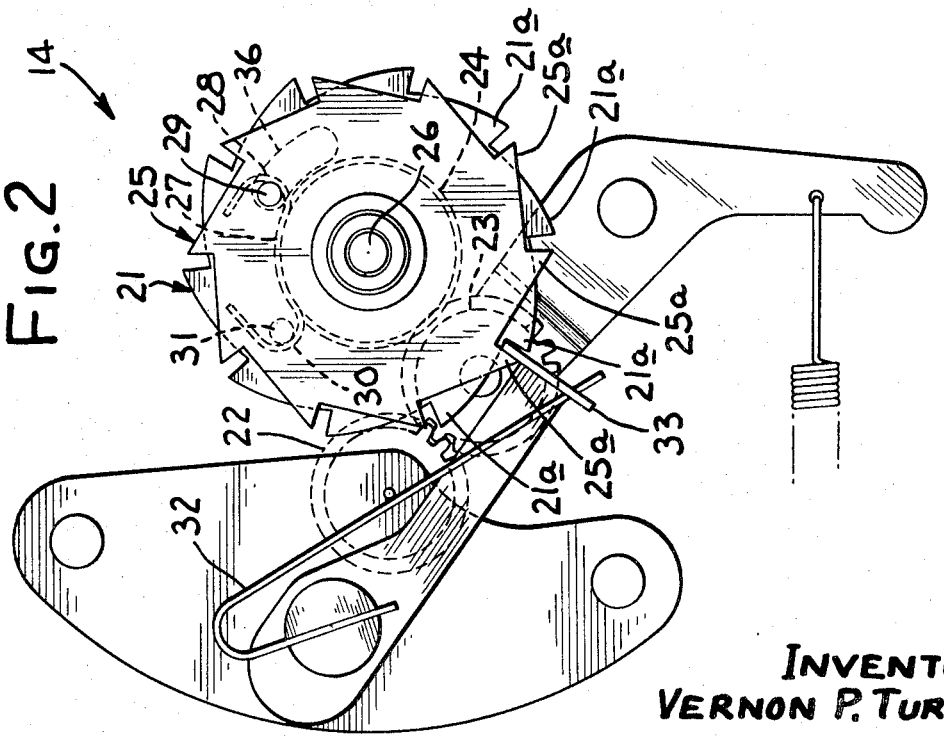
INVENTOR
VERNON P. TURNER
by: Wolfe, Hubbard, Voit & Osann
ATTYS.

DIGITAL TIMEKEEPING DEVICE WITH IMPROVED INDEXING MECHANISM

DESCRIPTION OF THE INVENTION

The present invention relates generally to time-keeping devices, and, more particularly, to time-keeping devices providing digital visual indication of the time.

Various devices have previously been used to provide readings of full integers at all times, such as the electrical meter device disclosed in U.S. Pat. No. 3,195,814, issued July 20, 1965. The device described in the aforementioned patent provides full integer meter readings utilizing two ratchet wheels with camming portions sloped in reverse to one another. One of the aforementioned ratchet wheels is held in position by an arm of a bellcrank until the second of the aforementioned ratchet wheels has undergone a preselected angular amount of rotation. The bellcrank arm is thereafter released, permitting the first of the ratchet wheels to rotate approximately the same angular amount as the second ratchet wheel with the rotation being limited by a second arm constructed integrally with the bellcrank. Indexing means of this type do not lend themselves to adaptation for use in time-keeping devices inasmuch as setting the initial reading of the device is not easily accomplished. Thus, when one of the arms of the bellcrank is in a position to permit rotation of the ratchet wheel, the second of the bellcrank arms is in a position to restrain motion of the ratchet wheel. This type of construction is not only permissible, but is actually desirable in a meter device, but it does not permit presetting and adjustment of the digital reading as is necessary in time-keeping devices.

It is, therefore, a primary object of the present invention to provide a time-keeping device which permits digital visual indication of the time in terms of full integers, and which may be set and adjusted with a minimum of difficulty to indicate the correct time.

It is another object of the present invention to provide a time-keeping device of the foregoing type which may utilize any one of several different types of drive means and power sources, including those currently used in automobile clocks.

It is a further object of the invention to provide such a time-keeping device characterized by its simplicity and which permits ease of manufacture even on a mass production basis, from readily available, inexpensive materials, and which may be easily serviced and adjusted in the event that such service and adjustment is required. In this connection, it is an ancillary object of the invention to provide an improved time-keeping device of the foregoing type which is economical.

Other objects and advantages of the invention will become apparent from the following detailed description taken in conjunction with the accompanying drawings in which:

FIG. 1 is a front elevational view of a digital time-keeping and indicating device embodying the invention;

FIG. 2 is an enlarged side elevation of the indexing mechanism in the device of FIG. 1 in a first stage of operation;

FIG. 3 is an enlarged side elevation of the indexing mechanism of FIG. 2 in a different stage of operation.

Figure 4:
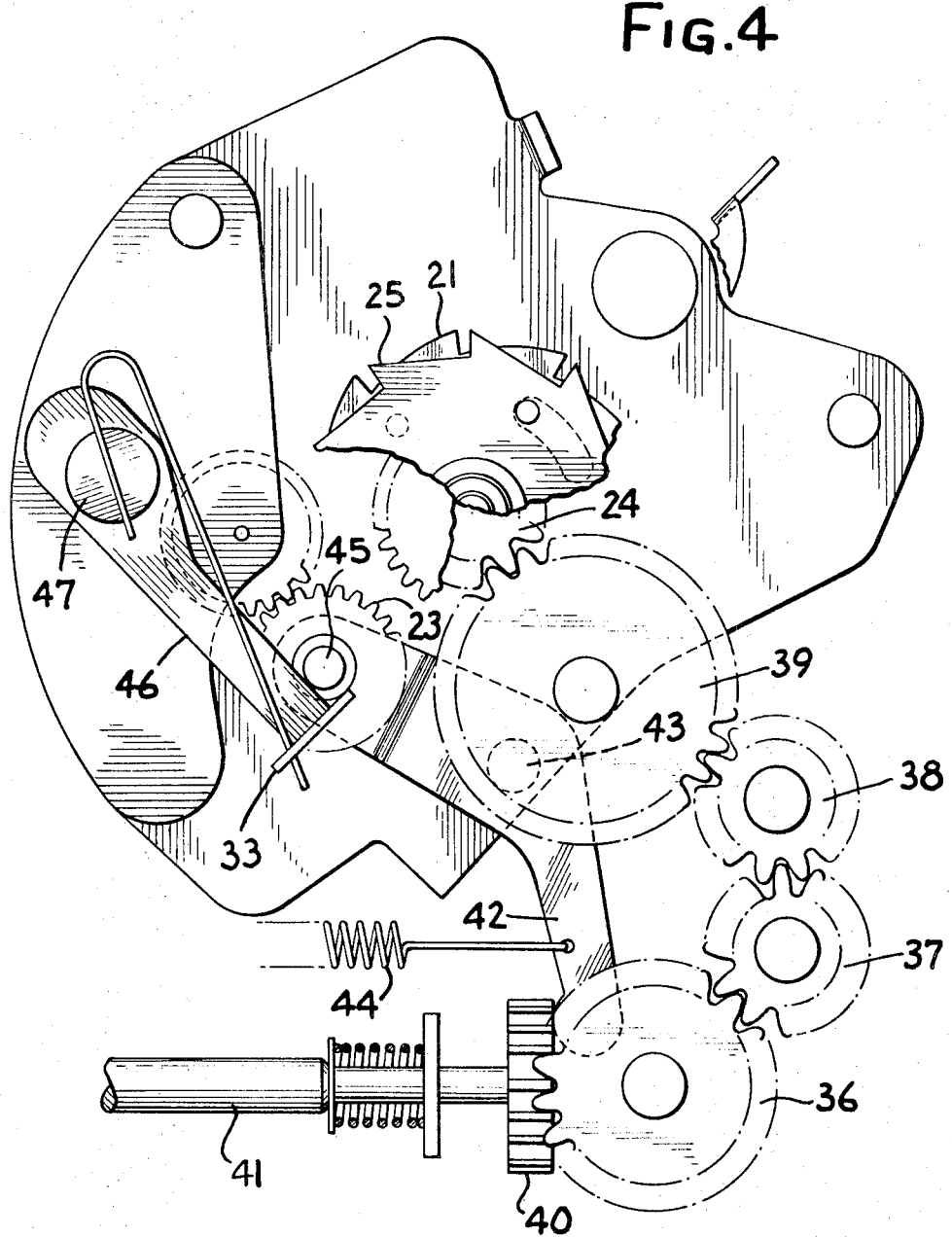
FIG. 4 is a side elevation, partially in section, of the presetting and adjusting mechanism in the device of FIG. 1, with portions of the indexing mechanism shown in FIGS. 2 and 3.

While the present invention is susceptible of various modifications and alternative forms, certain specific embodiments thereof have been shown by way of example in the drawings and will herein be described in detail. It should be understood, however, that it is not intended to limit the invention to the particular forms disclosed, but on the contrary, the intention is to cover all modifications, equivalents and alternatives falling within the spirit and scope of the invention.

Referring more particularly to the drawings, there is illustrated in FIG. 1 a time-keeping device comprising an hour drum 11 operatively connected to a 10-minute drum 12. The 10-minute drum 12 in turn is operatively connected to a minute drum 13, and the minute drum 13 is operatively connected to indexing means 14 driven by a drive means 15 connected to a power source 16. For the purpose of setting the desired initial position of the indexing means 14, it is also operatively connected to a setting means 17. It can be seen that appropriate numerals are provided on the peripheral surfaces of the drums 11, 12, and 13 to provide a digital indication of the time which is changed by rotation of one or more of the drums.

As will be apparent to those skilled in the art, the power source 16 may be any one of several types. In the preferred embodiment, the power source consists of a conventional reciprocating balance wheel of a type well known in the art, driven by a torsion spring which is periodically rewound by conventional electromagnet winding of the type used in automobile clocks today. The drive means 15 which operatively connects the power source 16 to the indexing means 14 consists of conventional gears or pinions. Further, the minute drum 13 is operatively connected to the 10-minute drum 12 by means of a conventional transfer pinion 18, and the 10-minute drum 12 is in turn operatively connected to the hour drum 11 by means of a similar transfer pinion 19. Of course, alternative drive means 15 may be selected, and alternative means for connecting the various indicating drums may also be utilized.

As shown most clearly in FIG. 2, the indexing means 14 includes a cam wheel 21 having a plurality of sloped camming surfaces 21a formed in the periphery thereof, said cam wheel 21 being operatively connected to the drive means 15 through the drive pinions 22 and 23, 24 for rotation about an axis 26 at a constant predetermined angular rate. Mounted concentrically on the axis 26 with the cam wheel 21 is an index wheel 25 having a plurality of ratchet teeth 25a sloped in the reverse direction from the camming surfaces 21a on the cam wheel 21. Although not specifically shown in the drawings, the index wheel 25 is directly attached to the minute drum 13 so that successive angular displacements of the index wheel 25 effect corresponding displacements of the minute drum 13, thereby changing the indicated time.

In order to rotate the index wheel 25 in the same direction as the cam wheel 21, a spring 27 is mounted between the cam wheel and index wheel for continuously urging the index wheel 25 in the same counterclockwise direction as viewed in FIGS. 2 and 3. As shown most clearly in FIG. 2, the spring 27 freely encircles part of the interior portions of the cam and index wheels, with one end 28 of the spring attached to a lug 29 on the cam wheel 21, and the other end 30 attached to a lug 31 on the index wheel 25. The construction of the spring 27 is such that limited differential rotation of the cam wheel 21 is permitted with respect to the index wheel 25, but the index wheel 25 is continuously biased to rotate in the same direction as the continuous rotation of the cam wheel 21.

In order to insure that the minute drum 13 provides indication of the time in terms of full integers, minute drum 13 is directly connected to the index wheel 25 which is held in successive fixed positions by a pawl 33 engaging the ratchet teeth 25a, thereby fixing the corresponding positions of the minute drum 13. The minute drum 13 is held in each position for a period of 1 minute, and thereafter rotated by an amount sufficient to advance the drum one division. The design of the drive means 15, the camming surfaces 21a, and the ratchet teeth 25a is such that the amount of time required to rotate each wheel through the angle occupied by one camming surface 25a is exactly 1 minute. Index wheel 25 has 10 such camming surfaces 25a, and is rotated one complete revolution during a time period of 10 minutes, thereby advancing minute drum 13 through one complete revolution, and further advancing 10-minute drum 12 by one division, in each 10-minute interval. Thus, digital visual indication of the time at all times is in terms of full integers.

For the purpose of holding the index wheel 25 in a fixed position until the cam wheel 21 has undergone a predetermined angular displacement, the pawl 33 is biased inwardly toward the ratchet teeth 25a by means of a spring 32. To periodically pivot the pawl 33 out its engagement with the ratchet teeth 25a, against the bias of the spring 27, the pawl 33 also engages the camming surfaces 21a of the cam wheel 21; thus, rotation of the cam wheel 21 periodically cams the pawl 33 away from both wheels 21 an 25, thereby releasing the index wheel 25 and permitting it to rotate in the same direction as the cam wheel 25. In FIG. 2, the pawl 33 is shown in its most advanced position, just after the wheel 25 has completed an indexing movement. In FIG. 3, the pawl 33 is shown in its retracted position, near the outermost surface of one of the camming surfaces 21a, so that minute additional rotation of the cam wheel 21 in the direction of normal operation will move the pawl 33 out of its engagement with the ratchet tooth 25a thereby permitting the index wheel 25 to rotate. The pawl 33 is maintained in its retracted position, disengaged from the index wheel 25, until it reaches the outermost end of the particular camming portion 21a on which it is riding. As the pawl reaches the outermost end of the camming portion 21a, it is free to drop onto the radially innermost portion of the next successive camming surface 21a, as shown in FIG. 2, to begin another operative cycle.

In accordance with one important aspect of the present invention, control means are provided acting between the cam wheel and the index wheel to limit the rotation of said index wheel, upon its release, to a predetermined angular displacement. Thus, in the illustrative arrangement, the cam wheel 21 is provided with a circumferential slot 36 disposed inwardly from the outer periphery of said cam wheel 21. A complemental lug 29 has one end attached to the index wheel 25 and the other end disposed within said slot 36 so as to limit the relative angular movement of the index wheel 25 with respect to the cam wheel 21. More specifically, the length of slot 36 is such that although rotation of the index wheel 25 is restrained by the pawl 33, the cam wheel 21 may undergo rotation sufficient to permit the camming portion 21a to move said pawl 33 out if its engagement with ratchet tooth 25a of the index wheel 25, as shown in FIG. 3. The location of the slot 36 and lug 29 are such that upon release of the index wheel 25 by the camming surface 21a of cam wheel 21 moving the pawl 33 out of its engagement with the ratchet tooth 25a of the index wheel 25, the ensuing rotation of the index wheel 25 is limited to the angular displacement required to move the minute drum 13 by one division, thereby changing the indicated time by 1 minute. Free rotation of index wheel 25 is permitted until the lug 29 contacts the leading end of the slot 36, thereby stopping the rotation of the index wheel 25 with respect to the cam wheel 21. Further minute rotation of the cam wheel 21 permits the biasing spring 32 to advance the pawl 33 into engagement with the next tooth formed by the index wheel 25, thereby beginning the next index sequence consisting of: restraining the rotation of the index wheel 25 by the pawl 33; rotating the cam wheel 21 at the predetermined angular rate for the amount required to permit the camming portion of said cam wheel 21 to move said pawl 33 out its engagement with the camming portion of said index wheel 25; permitting angular rotation of said index wheel 25 for the amount required to move the minute drum 13 by one division and thereafter restraining rotation of said index wheel 25 by engagement of its camming portion by said pawl 33. As will be apparent from the ensuing description, one of the important advantages of the particular control means provided by the present invention is that it permits selective positioning of the cam and index wheels upon moving the pawl out of its engagement with the camming portion of the index wheel. Such selective positioning may be achieved, for example, by manually rotating the index wheel.

Thus, in accordance with another important aspect of the present invention, the time-keeping device may be manually adjusted so as to indicate the correct time at a particular moment. This is accomplished, as shown clearly in FIG. 4, by moving the spring loaded pawl 33 to its retracted position; moving one of the drive pinions out of mesh, thereby disengaging the drive means from the indexing means; and then adjusting the positions of the cam and index wheels by turning a time setting pinion 40. The indexing means are manually rotated by slidably engaging the time setting pinion 40 with the pinion 36, and then manually rotating set pinion 40. When engaged, rotation of the setting pinion 40 effects rotation of the pinions 36, 37, 38 and 39 thereby rotating the pinion 24 which is directly attached to the cam wheel 21.

In order to provide for the disengagement of pinion 24 from the drive means, an arm 42 rotatable about axis 43 is provided, and the drive pinion 23 is affixed to, and rotatable about, a shaft 45 at one end of the arm 42. Slidably engaging the setting pinion 40 causes the pinion 40 to contact the opposite end of the arm 42, thereby causing the arm 42 to rotate about the axis 43, to move the drive pinion 23 out of mesh with the pinion 24. The arm 42 is biased by a spring 44 toward its normal position providing engagement of the drive pinion 24. As shown in FIG. 4, the shaft 45 upon which the drive pinion 23 rotates is extended in order to provide for engagement of the arm 46 to which the pawl is attached. Slidably engaging the time setting pinion 40, therefore, not only moves the drive pinion 23 out of mesh with the pinion 24, but also rotates the arm 46 about the shaft 47, thereby disengaging the pawl 33 from the index wheel 25 and the cam wheel 21. In this manner, rapid manual adjustment of the indexing mechanism can be effected to position the drums 11, 12 and 13 of FIG. 1 to indicate the correct time.

It will be understood that alternative means for setting the correct time may be provided if desired. For example, the drive means may be operatively connected to the cam wheel of the indexing means through a clutch thereby eliminating the necessity of displacing one of the drive pinions, and the pawl may be constructed so as to automatically slide out of engagement upon reverse rotation of the cam wheel. In this alternative, the pinion 36 is in engagement with a pinion (not shown) rigidly affixed to the cam wheel 21, the pinion 24 being operatively connected to the cam wheel 21 by means of a clutch. With this alternative arrangement, the arm 42 is eliminated inasmuch as manual engagement and rotation of set pinion 40 overcomes the rotational force of the drive means applied through the clutch. The arm 46 may be provided with a slotted hole adjacent shaft 47 providing that rotation of the cam wheel 21 in a direction reverse to that of normal operation will move the pawl 33, and the arm 46 to which the pawl is attached, out of engagement with index wheel 25, thereby permitting manual rotation of said cam and index wheels. In this position, rotation of cam wheel 21 in the direction of normal operation will permit the pawl 33 to return to its normal position and engage the camming portions of the index wheel 25.

Those experienced in the art of time-keeping devices will appreciate that this invention provides a new and unusual time-keeping device providing a digital visual indication of the time, permitting the use without substantial modification of any one of several types of power sources. The digital-indicating mechanism may be easily set and adjusted, and the overall mechanism is sufficiently simple that it can be efficiently manufactured on a mass production basis at a relatively low cost. Furthermore, the mechanism is reliable in operation and can be easily serviced.

I claim:

1. A time-keeping device comprising the combination of indicating means for providing digital visual indication of the time, indexing means for operating said indication means and drive means for operating said index means, said indexing means comprising the combination of a cam wheel having a plurality of sloped camming surfaces and being operatively connected to said drive means for rotation at a predetermined angular rate, an index wheel rotating about the same axis as the cam wheel and having a plurality of ratchet teeth sloped in a direction reverse of the camming surfaces of the cam wheel, means acting between the cam wheel and the index wheel for continuously urging the index wheel to rotate in the same direction as the cam wheel, means engaging both wheels providing restraint of the index wheel until the cam wheel has undergone a predetermined angular rotation and thereafter releasing said index wheel permitting said index wheel to rotate, control means acting between the cam wheel and the index wheel and independent of said restraining means to limit the rotation of said index wheel upon its release to the said predetermined angular rotation of the cam wheel, means for selective adjustment of the cam and index wheels for selecting the desired initial positions of said wheels, and means operatively connecting said index wheel to said indicating means.

2. A time-keeping device as set forth in claim 1 wherein said means for continuously urging the index wheel to rotate comprises a spring freely encircling part of the interior portions of said wheels, said spring having one end attached to said cam wheel and the other end attached to said index wheel.

3. A time-keeping device as set forth in claim 1 wherein said means providing restraint of said index wheel comprises a spring-loaded pawl engaging the ratchet teeth of said index wheel, said pawl being moved out of engagement with said ratchet teeth of said index wheel by rotation of the camming surfaces of said cam wheel, thereby permitting said index wheel to rotate.

4. A time-keeping device as set forth in claim 1 wherein said means acting between the cam wheel and the index wheel limiting the rotation of said index wheel comprises at least one circumferential slot, said slot being disposed inwardly from the outer periphery of one of said wheels, and a lug, said lug having one end attached to the other of said wheels and the other end disposed within said slot to limit the relative angular displacement of said wheels.

5. A time-keeping device as set forth in claim 1 wherein said means for selective adjustment of the cam and index wheels includes a manually engageable and manually rotatable pinion, gears communicating said pinion with said cam wheel, and means activated by engagement of said pinion for displacing said cam wheel drive means from said cam wheel.

6. A time-keeping device comprising the combination of indicating means for providing digital visual indication of the time, indexing means for operating said indicating means and drive means for operating said indexing means, said indexing means comprising the combination of of a cam wheel having a plurality of sloped camming surfaces and rotating about an axis, said cam wheel being operatively connected to said drive means for rotation at a predetermined angular rate, an index wheel rotating about the same axis as the cam wheel and having a plurality of ratchet teeth sloped in a direction reverse of the camming surfaces of the cam wheel, means acting between the cam wheel and the index wheel for continuously urging the index wheel to rotate in the same direction as the cam wheel, means engaging both wheels providing restraint of the index wheel until the cam wheel has undergone a predetermined angular rotation and thereafter releasing said index wheel permitting said index wheel to rotate, control means attached to one of said wheels and acting on the other of said wheels to limit the rotation of said index wheel upon its release to the said predetermined angular rotation of the cam wheel, means for selective adjustment of the cam and index wheels, and means operatively connecting said index wheel to said indicating means.